(12) United States Patent
Schaub

(10) Patent No.: US 7,031,331 B2
(45) Date of Patent: Apr. 18, 2006

(54) METHOD AND SYSTEM FOR MANAGING PACKETS IN A SHARED MEMORY BUFFER THAT SERVES MULTIPLE OUTPUT LINKS

(75) Inventor: Marc Schaub, Sunnyvale, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 1010 days.

(21) Appl. No.: 09/930,597

(22) Filed: Aug. 15, 2001

(65) Prior Publication Data

US 2003/0035372 A1 Feb. 20, 2003

(51) Int. Cl.
*H04L 12/56* (2006.01)
(52) U.S. Cl. .................................................. 370/412
(58) Field of Classification Search ............... 370/389, 370/412, 413, 414, 428, 429
See application file for complete search history.

(56) References Cited

U.S. PATENT DOCUMENTS

| | | |
|---|---|---|
| 5,535,197 A | 7/1996 | Cotton |
| 5,838,915 A | 11/1998 | Klausmeier et al. |
| 6,026,093 A | 2/2000 | Bellaton et al. |
| 6,567,417 B1 * | 5/2003 | Kalkunte et al. ........... 370/428 |
| 2002/0124149 A1 * | 9/2002 | Ni ................................. 711/170 |

* cited by examiner

*Primary Examiner*—Derrick Ferris
(74) *Attorney, Agent, or Firm*—Mark A. Wilson

(57) ABSTRACT

Managing packets in a shared memory buffer involves linking buffered packets into a linked list in the order that the packets are written into the shared memory buffer, examining the packets in the order of the linked list to determine which packets are intended for available output links, and then dispatching the oldest packet that is intended for an available output link even if the packet is preceded on the linked list by packets that are older but are intended for unavailable output links. Packets are stored with NEXT pointers that establish the linked list and output link identifiers that identify the intended output links of the packets. The head of the linked list is identified by a linked list HEAD pointer. When a packet is dispatched, the packet is removed from the linked list by adjusting the linked list HEAD pointer or the NEXT pointer of the previous packet.

41 Claims, 12 Drawing Sheets

METHOD AND SYSTEM FOR MANAGING PACKETS IN A SHARED MEMORY BUFFER THAT SERVES MULTIPLE OUTPUT LINKS

FIELD OF THE INVENTION

The invention relates to the dispatching of packets from a buffer that serves multiple output links, and more particularly to dispatching packets out of order with respect to the order that the packets were written into the buffer.

BACKGROUND OF THE INVENTION

Packet-switched networks are known to have bursty traffic patterns. Network nodes (i.e., switches and routers) use memory buffers to store packets when traffic bursts cause packets to be received at a faster rate than they can be processed. Many traffic control techniques, such as rate shaping, rate limiting, and weighted random early drop (WRED), are used in conjunction with memory buffers to deal with bursty traffic.

On the output side of a network node, memory buffers are often used to temporarily store packets when packets are passing through the network node faster than the packets can be transmitted out onto their intended output links. When a memory buffer serves only a single output link, packets are typically dispatched from the buffer in a simple first-in first-out (FIFO) manner.

Because of the bursty nature of packet-switched traffic and because buffer memory is relatively expensive, buffer memory is often shared among multiple output links of a network node. For example, FIG. 1 depicts a switch module 102 that includes three output links 104 (output links A, B, and C) and a shared memory buffer 106 that is shared among the three output links. The switch module also includes a rate controller 108 that controls the rate at which packets 110 are written into the memory buffer. Even though the memory buffer is shared among multiple output links, packets are stored within the buffer and dispatched from the buffer on a FIFO basis. Referring to FIG. 1 for example, the packet that is at the head of the shared FIFO buffer (packet B1) must be dispatched to its intended output link (output link B) before the next packet in the shared FIFO buffer can be dispatched to its intended output link. While this technique works well if the output links are always available to transmit packets, the technique creates a head-of-line blocking problem in the shared FIFO buffer when the intended output link of the head packet is unavailable for transmission.

FIG. 2 depicts the head-of-line blocking problem that occurs when the head packet in a shared FIFO buffer is intended for an output link that is unavailable for transmission. In the example depicted in FIG. 2, output link B is unavailable for transmission and because the head packet is intended for the unavailable output link, the packets in the buffer that are intended for output links A (packets A1, A2, A3, and A4) and C (packets C1, C2, and C3) are blocked by the head packet. That is, the packets that are intended for output links A and C are blocked from being transmitted by the head packet, which is intended for the unavailable output link B, even though output links A and C are available for transmission.

Traditional packet-switched network nodes were not designed to ensure that all of the packets from the same flow are forwarded in the same order that they are received. However, as packet-switched networks begin to carry more time-sensitive traffic, such as voice and real-time video traffic, it is important that packets from the same flow of packets (i.e., all of the "A" packets in the FIFO buffer of FIG. 2) be transmitted from a network node in the same order that they are received. When packets are dispatched from a memory buffer on a strict FIFO basis, the order of the packets from the same flow is automatically preserved. For example, as long as the packets 110 shown in FIG. 2 are dispatched on a FIFO basis, the order of the packets related to each output link is maintained. Although the strict FIFO technique preserves the order of the packets, it leads to the head-of-line blocking problem as described above.

In view of the importance of shared memory buffers in packet-switched networks, what is needed is a technique for dispatching packets from a shared memory buffer that eliminates head-of-line blocking and maintains the order of packets from each flow.

SUMMARY OF THE INVENTION

A method and system for managing packets in a shared memory buffer involves linking buffered packets into a linked list in the order that the packets are written into the shared memory buffer, examining the packets in the order of the linked list to determine which packets are intended for available output links, and then dispatching the oldest packet that is intended for an available output link even if the packet is preceded on the linked list by packets that are older but are intended for unavailable output links. The technique overcomes the head-of-line blocking problem by using a linked list to identify the oldest packet that is intended for an available output link and dispatching the packet out-of-order even if the packet is not the absolute oldest packet in the shared memory buffer. Although some packets may be dispatched out-of-order with respect to all of the packets in the shared memory buffer, the use of a linked list ensures that the order of packets that are intended for the same output link is maintained.

In an embodiment, the packets are stored with NEXT pointers that establish the linked list and output link identifiers that identify the intended output links of the packets.

The process of examining packets is performed in cycles and each cycle begins at the head of the linked list of packets. The availability of the output links is identified at the beginning of each cycle and is not updated until the beginning of the next cycle. In an embodiment, the head of the linked list is identified by a linked list HEAD pointer. When the packet at the head of the linked list is dispatched, the packet is removed from the linked list by adjusting the linked list HEAD pointer to identify the next packet on the linked list. When a packet other than the head packet is dispatched, the packet is removed from the linked list by setting the NEXT pointer of the previous packet to the same value as the dispatched packet's NEXT pointer.

Other aspects and advantages of the present invention will become apparent from the following detailed description, taken in conjunction with the accompanying drawings, illustrating by way of example the principles of the invention.

DETAILED DESCRIPTION OF THE INVENTION

A technique for dispatching packets from a shared memory buffer involves linking buffered packets into a linked list in the order that the packets are written into the shared memory buffer, going through the packets in the order of the linked list, and dispatching the first packet that is intended for an available output link even if the first packet that is intended for an available output link is not the oldest packet on the linked list.

Figure 1:
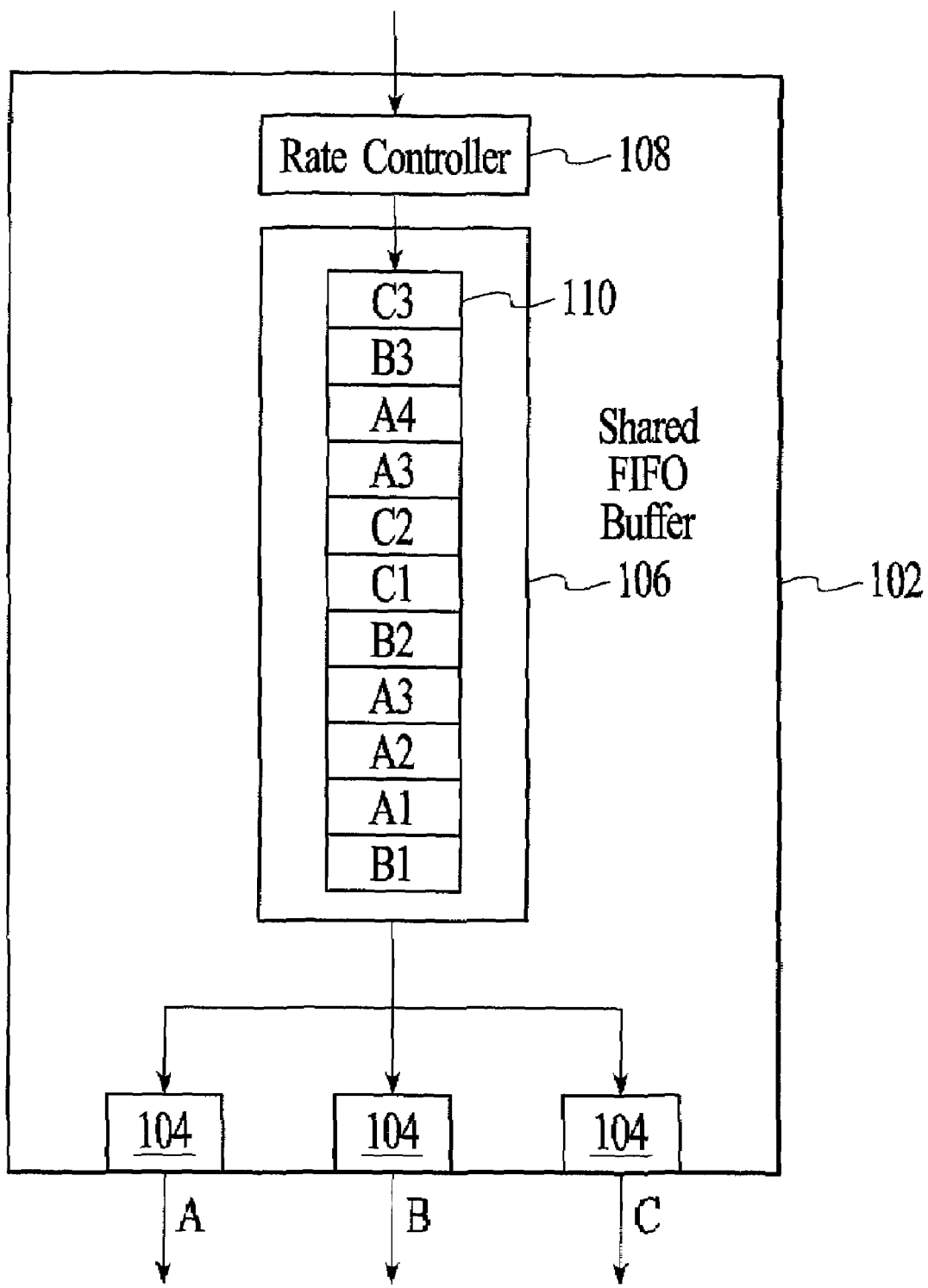
FIG. 1 depicts a switch module that includes three output links and a shared memory buffer in which packets are dispatched on a FIFO basis in accordance with the prior art.
Figure 2:
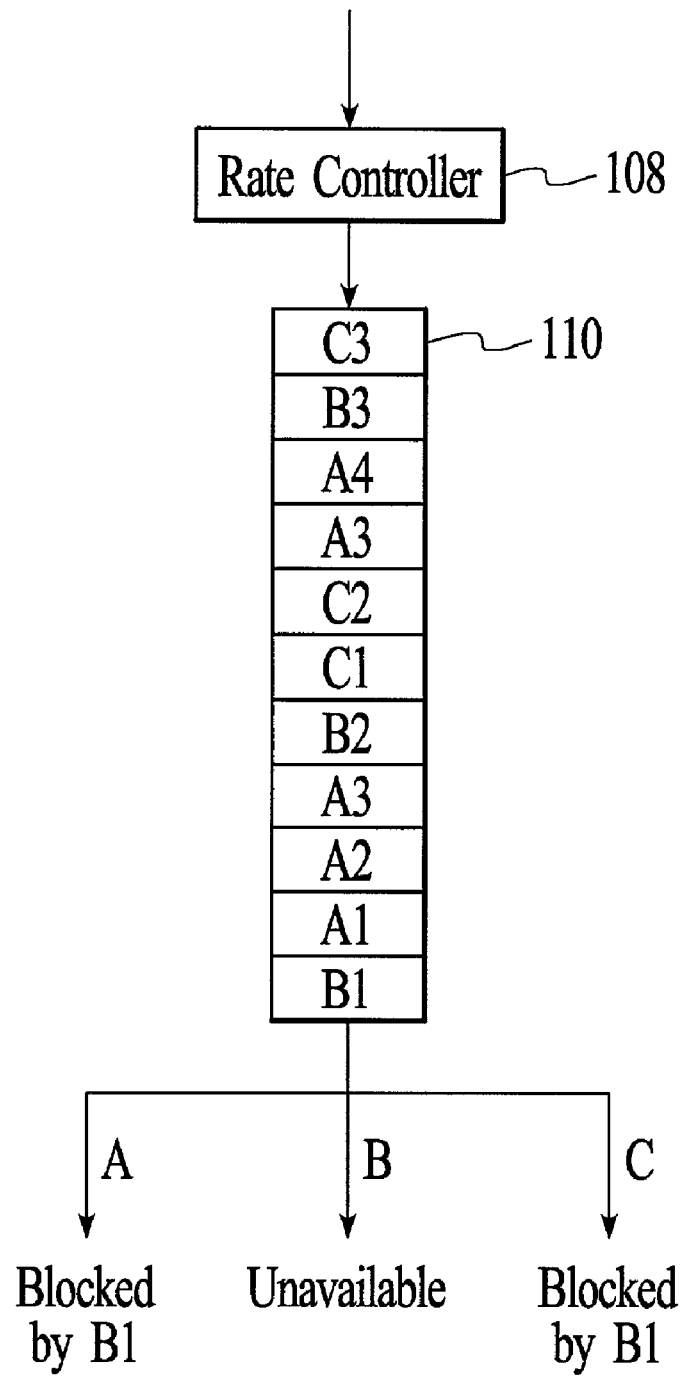
FIG. 2 depicts the head-of-line blocking problem that occurs when the head packet in a shared FIFO buffer is intended for an unavailable transmission link.
Figure 3:
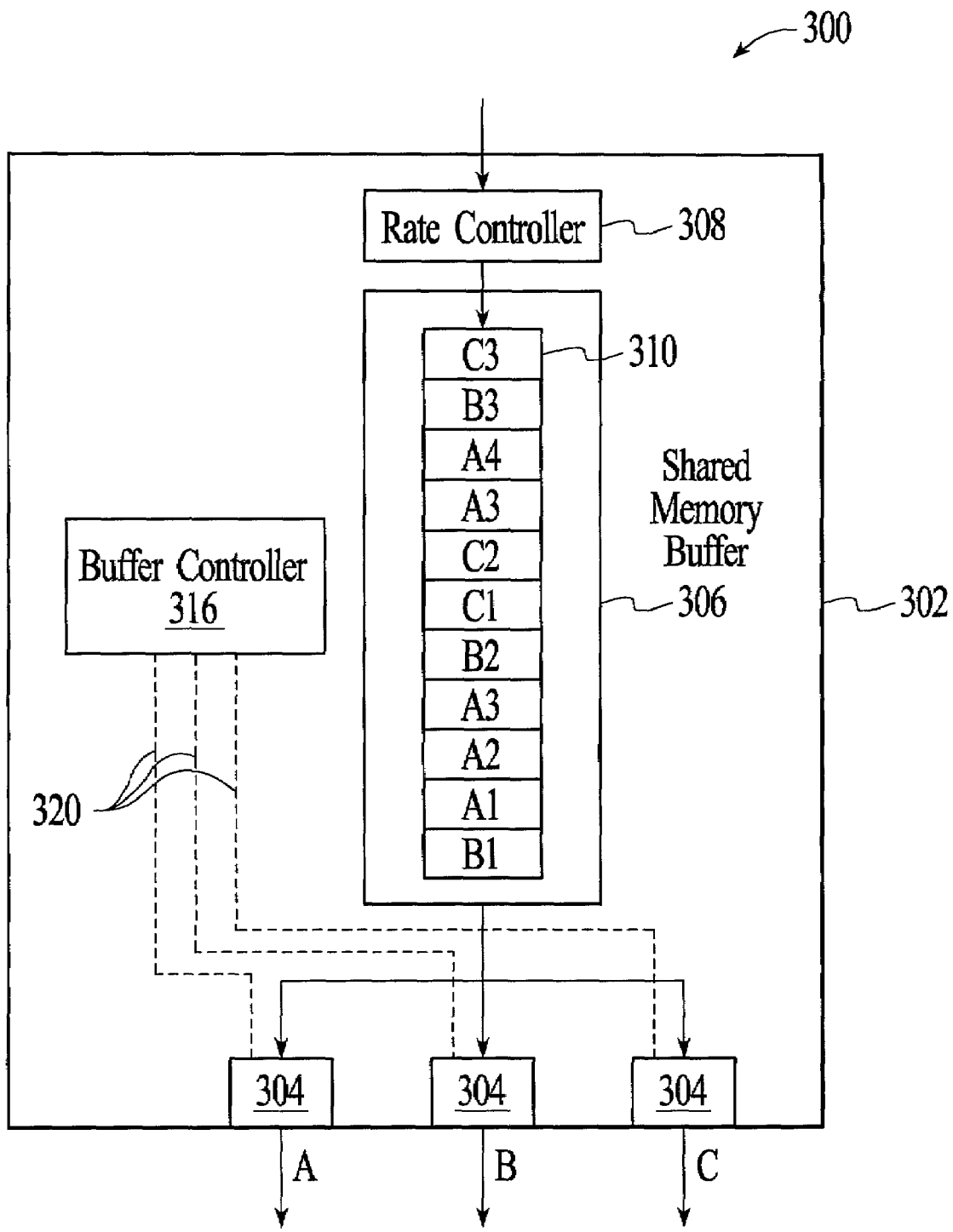
FIG. 3 depicts a system for dispatching packets from a shared memory buffer that overcomes the head-of-line blocking problem in accordance with an embodiment of the invention.

FIG. 3 depicts a system 300 for dispatching packets from a shared memory buffer that serves multiple output links. The system includes a rate controller 308, a shared memory buffer 306, a buffer controller 316, and three output links 304. In the embodiment of FIG. 3, the system is integrated into a switch module 302 that is a component of a network node, such as a switch or a router. The switch module is, for example, a switch card that is inserted into a chassis-based network node. In an embodiment, the switch module performs other functions such as packet processing and forwarding look-ups. The individual elements of the system are described first followed by a description of the system's operation and a process flow diagram.

The rate controller 308 controls the writing of packets into the shared memory buffer. The rate controller may utilize known traffic control techniques, such as rate shaping, rate limiting, and WRED, to control the rate at which packets are written into the shared memory buffer 306. The rate controller is not critical to the invention but is depicted to show that other techniques of traffic management may be used in conjunction with the technique for dispatching packets from the shared memory buffer that is described herein. Although the rate controller is shown as an element of the switch module 302, the rate controller may alternatively be located off of the switch module.

The shared memory buffer 306 stores packets 310 that are to be dispatched to one or more of the output links 304. The shared memory buffer stores incoming packets as they are received and the stored packets are dispatched from the shared memory buffer as described below. In an embodiment, the shared memory buffer includes random access memory (RAM) that is connected by buses to the output links.

The output links 304 transmit packets to their next destination. The output links include electrical, optical, and/or radio frequency transmitters. When an output link is not in the process of transmitting a packet, the output link is defined herein as available for transmission. Likewise, when an output link is in the process of transmitting a packet, the output link is defined herein as unavailable for transmission. An output link may be unavailable for transmission for reasons besides that the output link is in the process of transmitting. For example, the output link may be unavailable for transmission because an output link queue is full, because the machine that is attached to the other end of the link has indicated that it cannot take any more traffic, because the link is damaged, because of a hardware problem (i.e., a transmitter or receiver problem), or because the quality of the transmission has fallen below an established acceptable level. For example, the output link may be considered unavailable if the bit error rate (BER) of the transmission falls below an established BER threshold.

The status of each output link 304 is communicated to the buffer controller 316 through connections 320. In the embodiment of FIG. 3, the status of each output link is indicated as either available or unavailable for transmission.

The buffer controller 316 manages the dispatching of packets from the shared memory buffer 306. The buffer controller performs the functions that are described below with reference to FIGS. 4–12. In an embodiment, the buffer controller performs the described functions through hardware, however the buffer controller may be implemented in software or a combination of hardware and software. Throughout the description, similar reference numbers may be used to identify similar elements.

Figure 4:
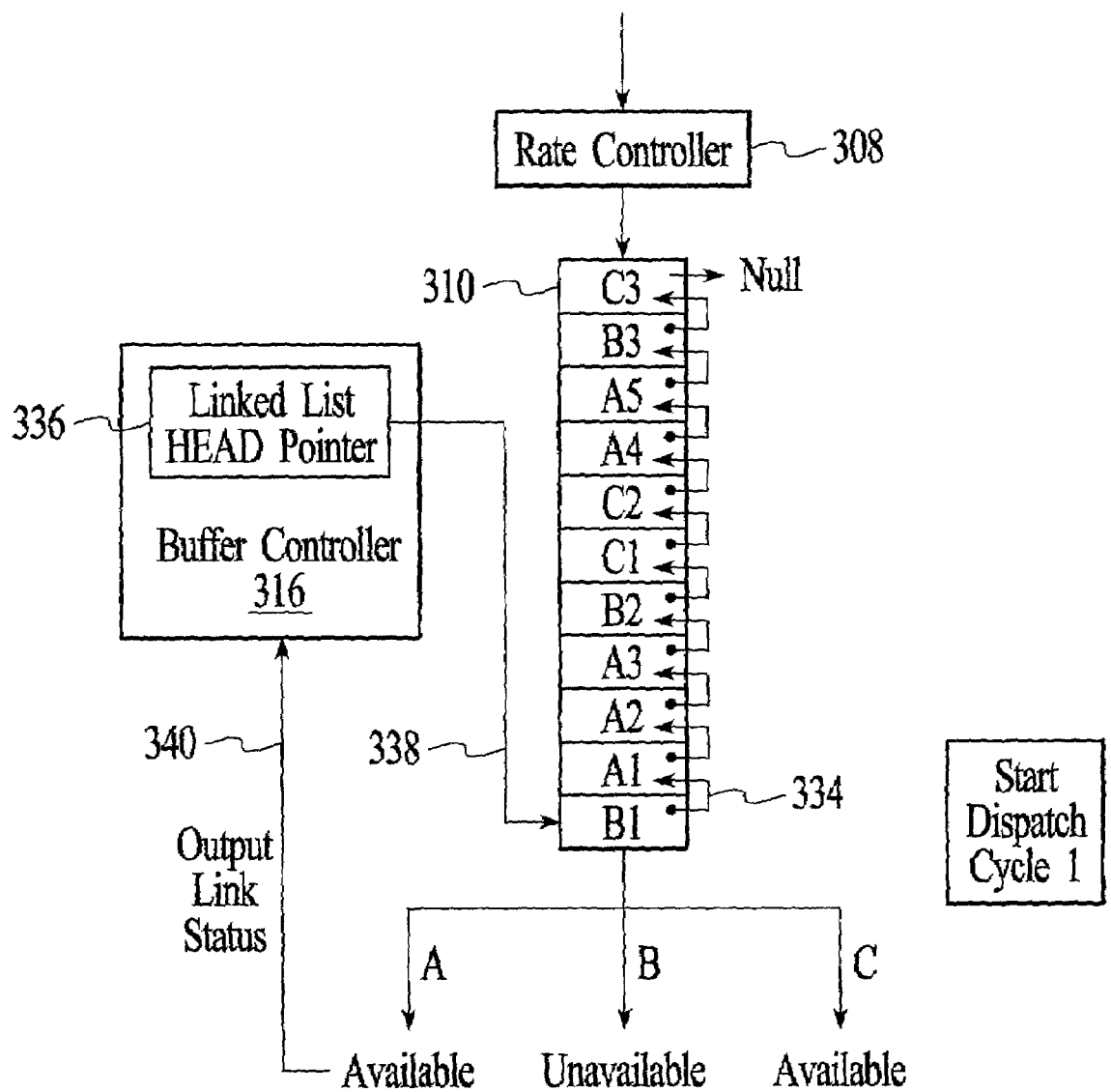
FIG. 4 is a logical depiction of the start of a dispatch cycle, dispatch cycle 1, that dispatches packets in accordance with the invention.

FIG. 4 is a logical depiction of the functions that are carried out by the buffer controller. The technique for dispatching packets is described in FIGS. 4–10 as a series of three dispatch cycles. Referring to FIG. 4, packets 310 are written into the shared memory buffer and are linked together into a linked list in the order that the packets are written into the buffer. Each packet is identified, for description purposes, by the intended output link of the packet and a sequence number that is specific to each output link. For example, the packets that are intended for output link A are identified sequentially as packets A1, A2, A3, A4, and A5 and any subsequent packets intended for output link A continue the number sequence. At the start of example dispatch cycle 1, the linked list includes eleven buffered packets, with packets A1, A2, A3, A4, and A5 intended for output link A, packets B1, B2, and B3 intended for output link B, and packets C1, C2, and C3 intended for output link C. The packets are stored in the shared memory buffer and linked together in the order that the packets were written into the shared memory buffer. In the examples of FIGS. 4–11 the oldest packets are logically depicted at the bottom of the shared memory buffer (with the oldest packet being at the bottom) and the newest packets are logically depicted at the top of the shared memory buffer (with the newest packet being at the top). Although the packets are depicted in sequence for description purposes, it should be understood that the packets can be linked into a linked list regardless of where the packets are physically stored within the shared buffer memory. In addition, the shared memory buffer can store more packets than the eleven that are depicted for example purposes.

Figure 5:
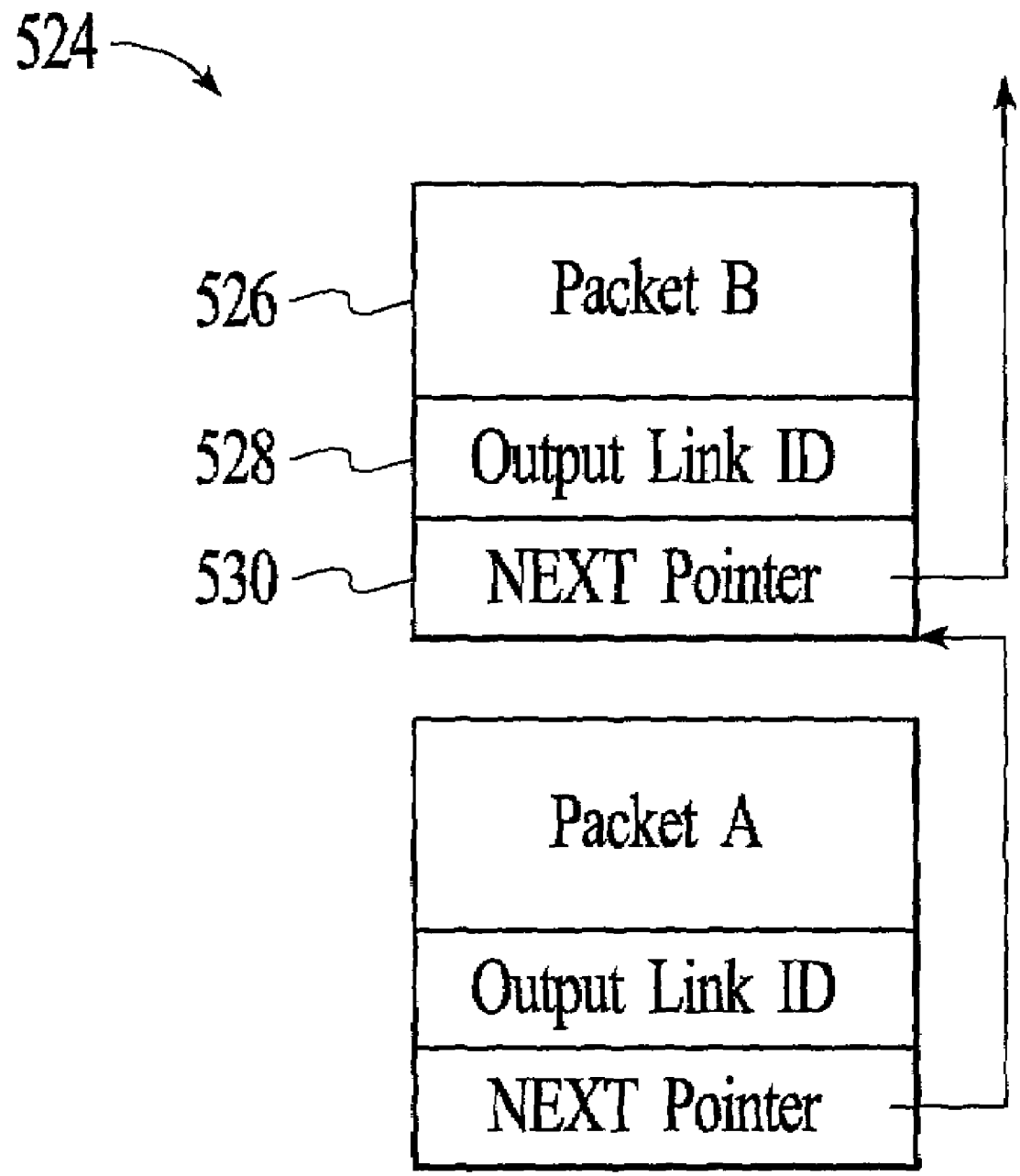
FIG. 5 depicts a packet structure that is used to store packets in accordance with an embodiment of the invention.

The linked list shown in FIG. 4 is formed by setting a NEXT pointer for each packet to identify the next packet that was written into the shared memory buffer. FIG. 5 depicts an example of a packet structure 524 that is used to store packets in the shared buffer memory. The packet structure includes the packet 526, an output link identifier (ID) 528, and a NEXT pointer 530. The NEXT pointer identifies the memory location of the next packet in the linked list. As shown in FIG. 5, the NEXT pointer of packet A identifies packet B and the NEXT pointer of packet B identifies the next packet on the linked list. The output link ID identifies the intended output link of the respective packet. Although a particular packet structure is depicted, other packet structures that identify the next packet in a linked list and the intended output link may be utilized.

Referring back to the logical representation of buffered packets in FIG. 4, the arrows 334 between the packets indicate how the packets in the shared memory buffer are linked into a linked list. For example, packet B1 is linked to packet A1, packet A1 is linked to packet A2, and so on. The NEXT pointer of the last packet on the list indicates, for example by a null value, that it is the last packet on the linked list. The linked list is established and maintained by the buffer controller.

In addition to the NEXT pointers that form the linked list, the buffer controller 316 establishes and maintains a linked list HEAD pointer 336 that identifies the head packet on the linked list. The head packet on the linked list is the oldest packet on the linked list. The logical line 338 in FIG. 4 indicates which packet is identified by the linked list HEAD pointer as the head packet on the linked list. Each new dispatch cycle for dispatching packets begins at the head packet that is identified by the linked list HEAD pointer. When the head packet on the linked list is dispatched to its intended output link, the linked list HEAD pointer is adjusted to identify the next packet on the linked list.

In operation, the technique for dispatching packets involves going through the packets in the order of the linked list and dispatching the first packet that is intended for an available output link even if the first packet that is intended for an available output link is not the oldest packet on the linked list. Referring specifically to the example of FIG. 4, at the beginning of dispatch cycle 1, the status of each output link is communicated to the buffer controller (as indicated by line 340). In the example of FIG. 4, at the start of dispatch cycle 1, output link A is available, output link B is unavailable, and output link 3 is available. In an embodiment, the status of the output links is not changed during a dispatch cycle even if an output link becomes available during the cycle. According to the technique, the first packet to be examined in each dispatch cycle is the head packet. The head packet in dispatch cycle 1 (packet B1 as identified by the linked list HEAD pointer) is intended for output link B, which is currently unavailable. In prior art systems, when the head packet is intended for an unavailable output link, head-of-line blocking prevents any other packets from being dispatched from the shared memory buffer until output link B becomes available and packet B1 is dispatched. However, according to an embodiment of the invention, the buffer controller continues to examine packets to identify and dispatch a packet that is intended for an available output link. The next packet on the linked list that is examined by the buffer controller 316 is located using the NEXT pointer of the head packet. The next packet is examined (i.e., by examining the output link ID of the packet) to determine whether or not the packet is intended for an available output link. In the example of FIG. 4, the next packet, packet A1, is intended for output link A, which is currently available. Because packet A1 is intended for an available output link, packet A1 is dispatched to its intended output link.

In an embodiment, a cycle of dispatching packets is completed upon the dispatch of a single packet to its intended output link. However, in an alternative embodiment, the process can be continued to see if any other buffered packets can be dispatched to any other available output links. To determine if there are any other buffered packets that can be dispatched to any other available output links, the buffer controller 316 continues to examine packets in the order of the linked list, starting at the next packet on the linked list. In the example of FIG. 4, packets A2 and A3 cannot be dispatched because packet A1 has been dispatched to output link A and packet B2 cannot be dispatched because output link B is unavailable. Following the order of the linked list, packet C1 is the next packet that is intended for an available output link and therefore packet C1 is also dispatched during dispatch cycle 1.

Once a packet is dispatched from the middle of the linked list (i.e., any packet other than the head packet), the linked list must be adjusted to remove the packet from the linked list. Specifically, the dispatched packet is removed from the linked list by setting the NEXT pointer of the previous packet on the linked list to the same value as the dispatched packet's NEXT pointer. For example, to remove packet A1 from the linked list, the NEXT pointer of packet B1 (the previous packet on the linked list) is set to identify packet A2 (the same packet that is identified by packet A1's NEXT pointer). Likewise, to remove packet C1 from the linked list, the NEXT pointer of packet B2 is set to identify packet C2.

Figure 6:
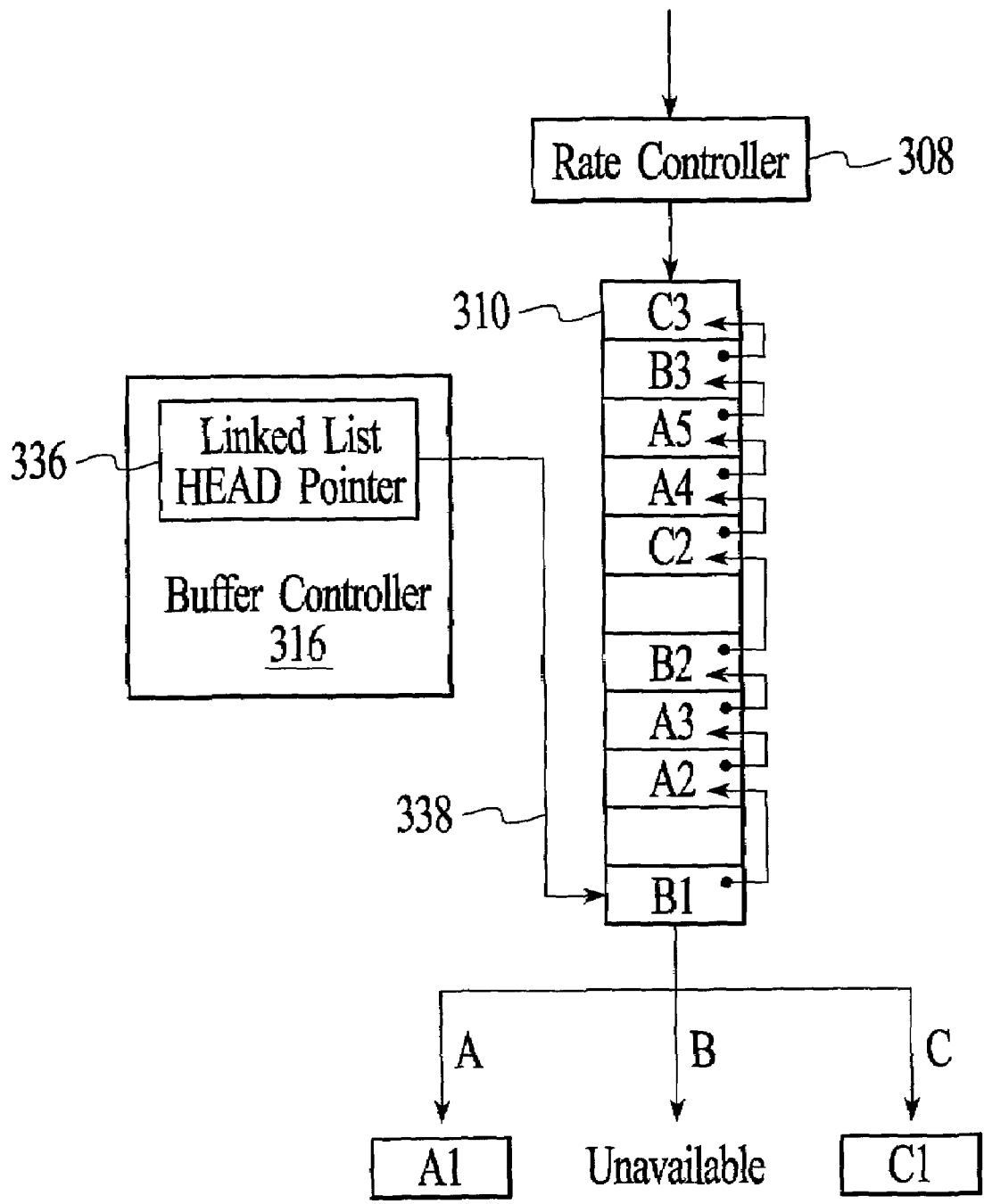
FIG. 6 is a logical depiction of dispatch cycle 1 after packets have been dispatched to available output links in accordance with an embodiment of the invention.

FIG. 6 logically depicts the status of the linked list and the linked list HEAD pointer 336 after packets A1 and C1 have been dispatched to their respective output links. As shown in FIG. 6, packet A1 is removed from the linked list by adjusting the NEXT pointer of packet B1 and packet C1 is removed from the linked list by adjusting the NEXT pointer of packet B2. Because the packet at the head of the linked list, packet B1, was not dispatched, the linked list HEAD pointer continues to identify packet B1. Utilizing the above-described technique, even though the head packet is intended for an output link that is unavailable, the head-of-line blocking problem of prior art systems is overcome by using the linked list to examine subsequent packets that can be dispatched to available output links.

Figure 7:
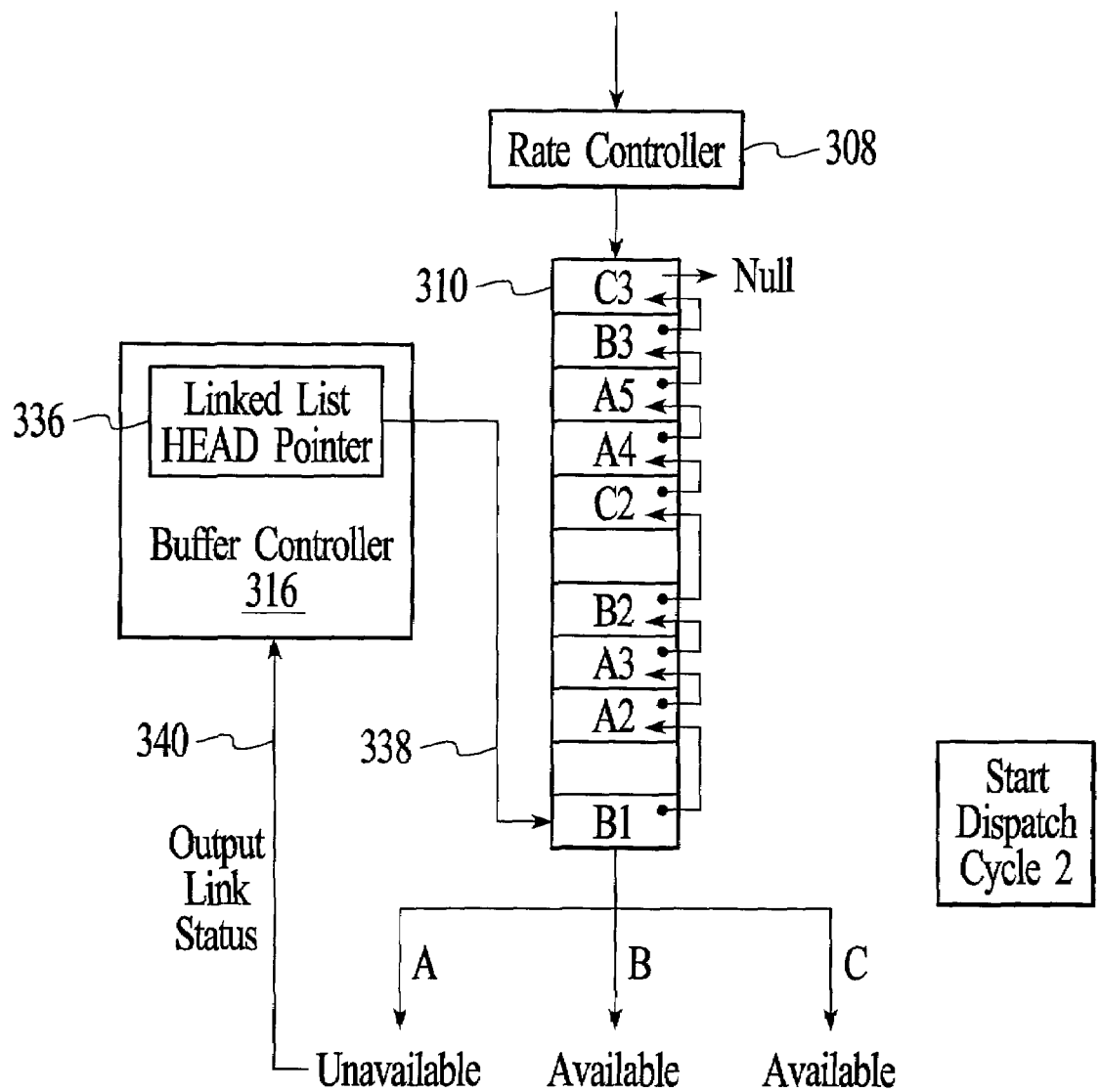
FIG. 7 is a logical depiction of the start of another dispatch cycle, dispatch cycle 2, that dispatches packets in accordance with the invention.

FIG. 7 depicts the beginning of a new dispatch cycle, dispatch cycle 2. At the beginning of dispatch cycle 2, the status of each output link is again determined by the buffer controller 316. In the example of FIG. 7, at the start of dispatch cycle 2, output link A is unavailable, output link B is available, and output link 3 is available. According to the technique, the first packet to be examined in dispatch cycle 2 is again the head packet. The head packet in dispatch cycle 2 (packet B1 as identified by the linked list HEAD pointer 336) is intended for output link B, which is now available. Because output link B is now available, packet B1 is dispatched to the available output link. Once the head packet is dispatched, the linked list HEAD pointer is adjusted to remove the packet from the linked list. The linked list HEAD pointer is adjusted to identify the next packet in the linked list (i.e., the packet that was identified by the NEXT pointer of the dispatched packet). In the example of FIG. 7, the linked list HEAD pointer is adjusted to identify packet A2, thereby removing packet B1 from the linked list.

As with the previous dispatch cycle, the cycle of dispatching packets can be continued to see if any other buffered packets can be dispatched to any other available output links. To determine if there are any other buffered packets that can be dispatched to available output links, the packets are examined in the order of the linked list. In the example of FIG. 7, packets A2 and A3 cannot be dispatched because output link A is unavailable and packet B2 cannot be dispatched because packet B1 has been dispatched to output link B. Packet C2 is the next packet on the linked list and because output link C is available, packet C2 is also dispatched during dispatch cycle 2. The linked list is adjusted, as described above, to delete dispatched packet C2 from the linked list.

Figure 8:
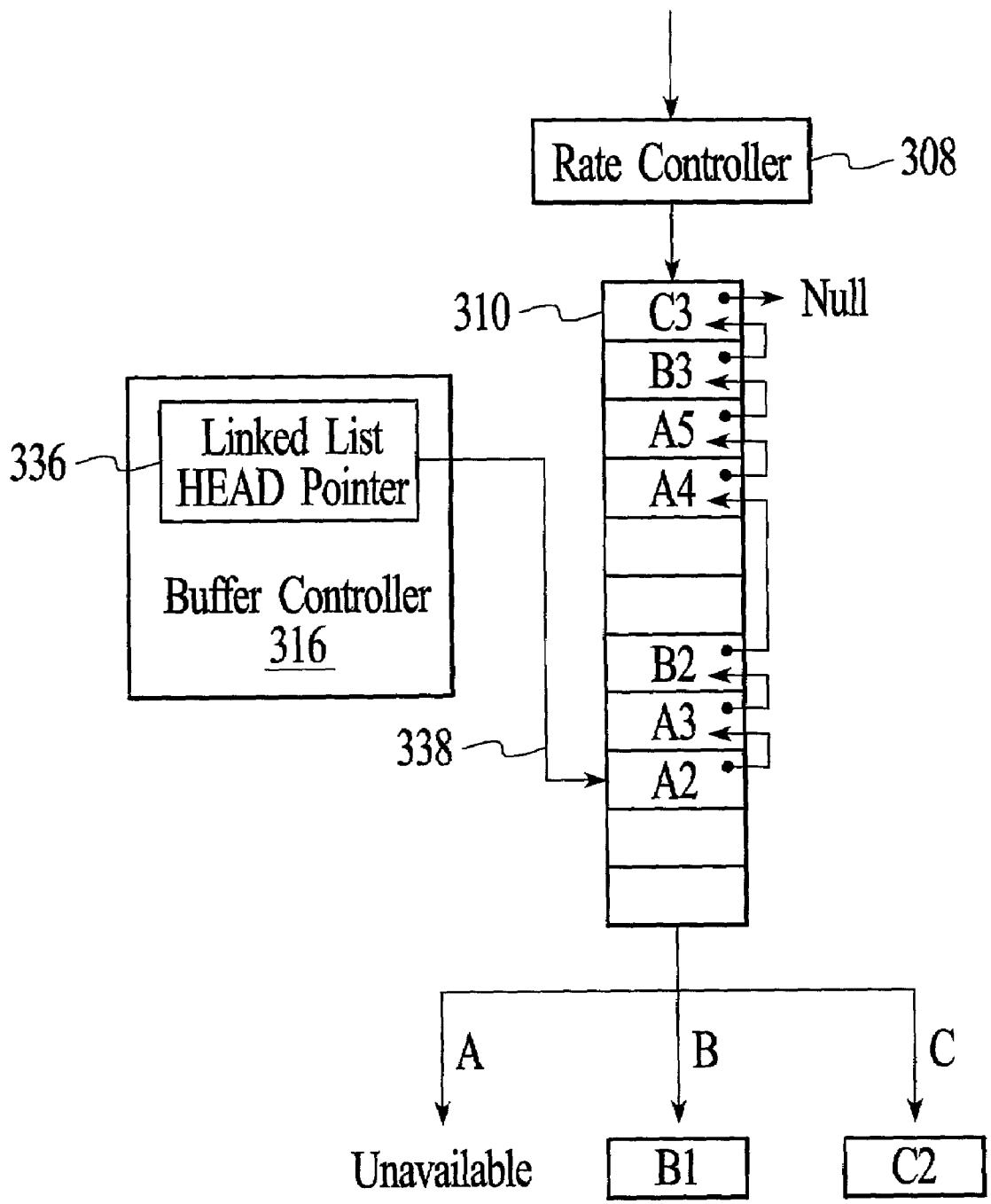
FIG. 8 is a logical depiction of dispatch cycle 2 after packets have been dispatched to available output links in accordance with an embodiment of the invention.

FIG. 8 logically depicts the status of the linked list and the linked list HEAD pointer 336 after packets B1 and C2 have been dispatched to their respective output links. As shown in FIG. 8, packet B1 is removed from the linked list by adjusting the linked list HEAD pointer to identify packet A2 and packet C2 is removed from the linked list by adjusting the NEXT pointer of packet B2 to identify packet A4.

Because the packets are always examined starting from the head of the linked list and because the status of the output links is established at the beginning of each cycle, packets intended for the same output link are always dispatched in the proper FIFO order. That is, the packets in any sequence of packets that are intended for the same output link will always be dispatched in the same order (on a FIFO basis) that the packets were written into the shared memory buffer because each dispatch cycle starts at the head of the linked list.

Figure 9:
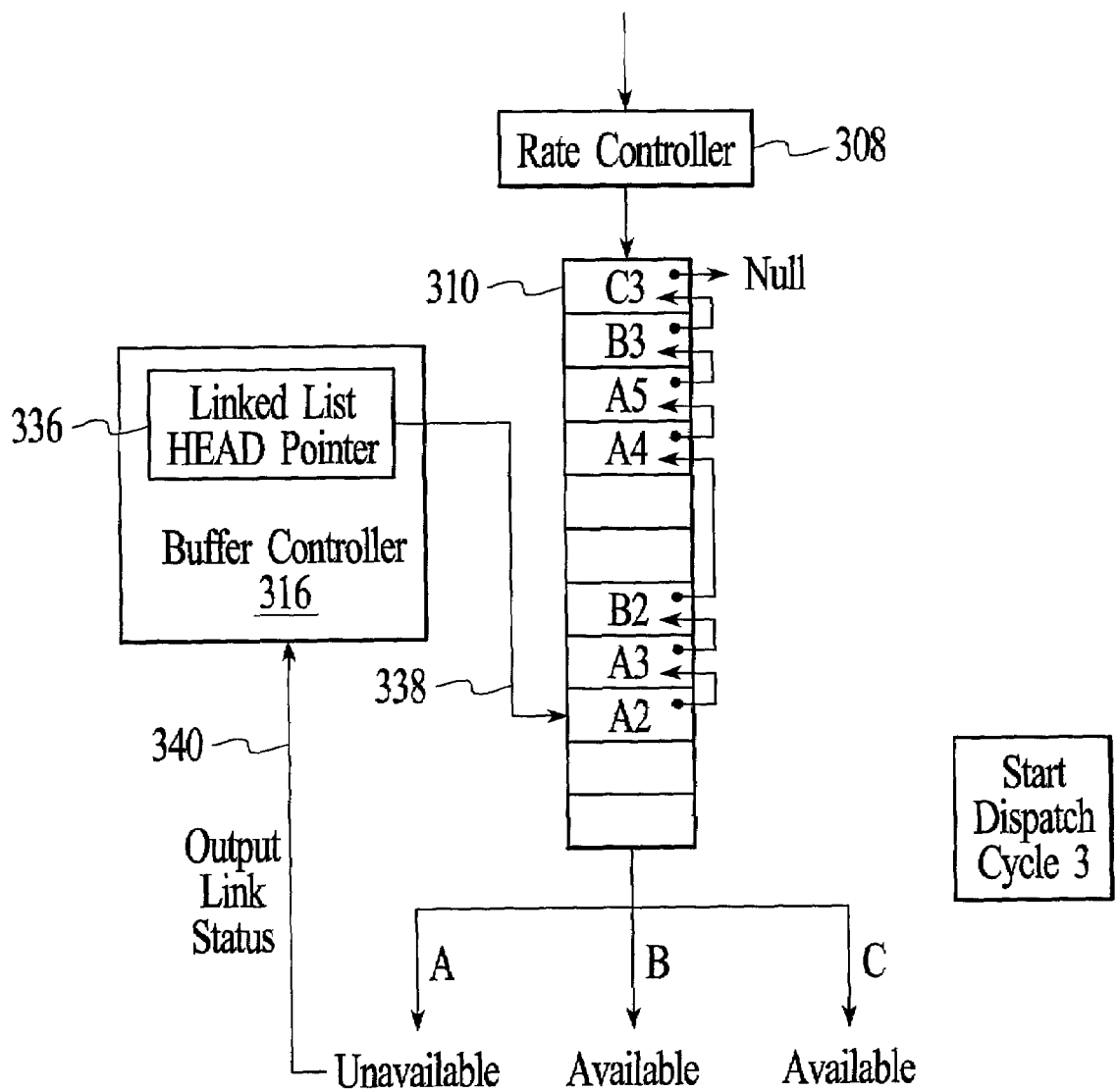
FIG. 9 is a logical depiction of the start of another dispatch cycle, dispatch cycle 3, that dispatches packets in accordance with the invention.

FIG. 9 depicts the beginning of another dispatch cycle, dispatch cycle 3. At the beginning of dispatch cycle 3, the status of each output link is again determined by the buffer controller. In the example of FIG. 9, at the start of dispatch cycle 3, output link A is unavailable, output link B is available, and output link C is available. According to the technique, the first packet to be examined in dispatch cycle 3 is the head packet. The head packet in dispatch cycle 2 (packet A2 as identified by the linked list HEAD pointer 336) is intended for output link A, which is currently unavailable, and therefore the head packet cannot be dispatched in this cycle. As described above, the buffer controller continues to examine packets to identify a packet that is intended for an available output link. The next packet in the linked list is identified by the buffer controller using the NEXT pointer of the head packet. The next packet is examined (i.e., by examining the output link ID of the packet) to determine whether or not the packet is intended for an available output link. In the example of FIG. 4, the next packet, packet A3, is intended for output link A, which is currently unavailable and therefore the next packet in the linked list is examined. The next packet, packet B2, is intended for an available output link. Because packet B2 is intended for an available output link, it is dispatched to its intended output link. The process is continued sequentially by examining subsequent packets on the linked list to see if any other buffered packets can be dispatched to any other available output links. In the example of FIG. 9, packet C3 is the next packet that is intended for an available output link, so packet C3 is also dispatched in dispatch cycle 3. The linked list is adjusted, as described above, to delete the dispatched packets from the linked list.

Figure 10:
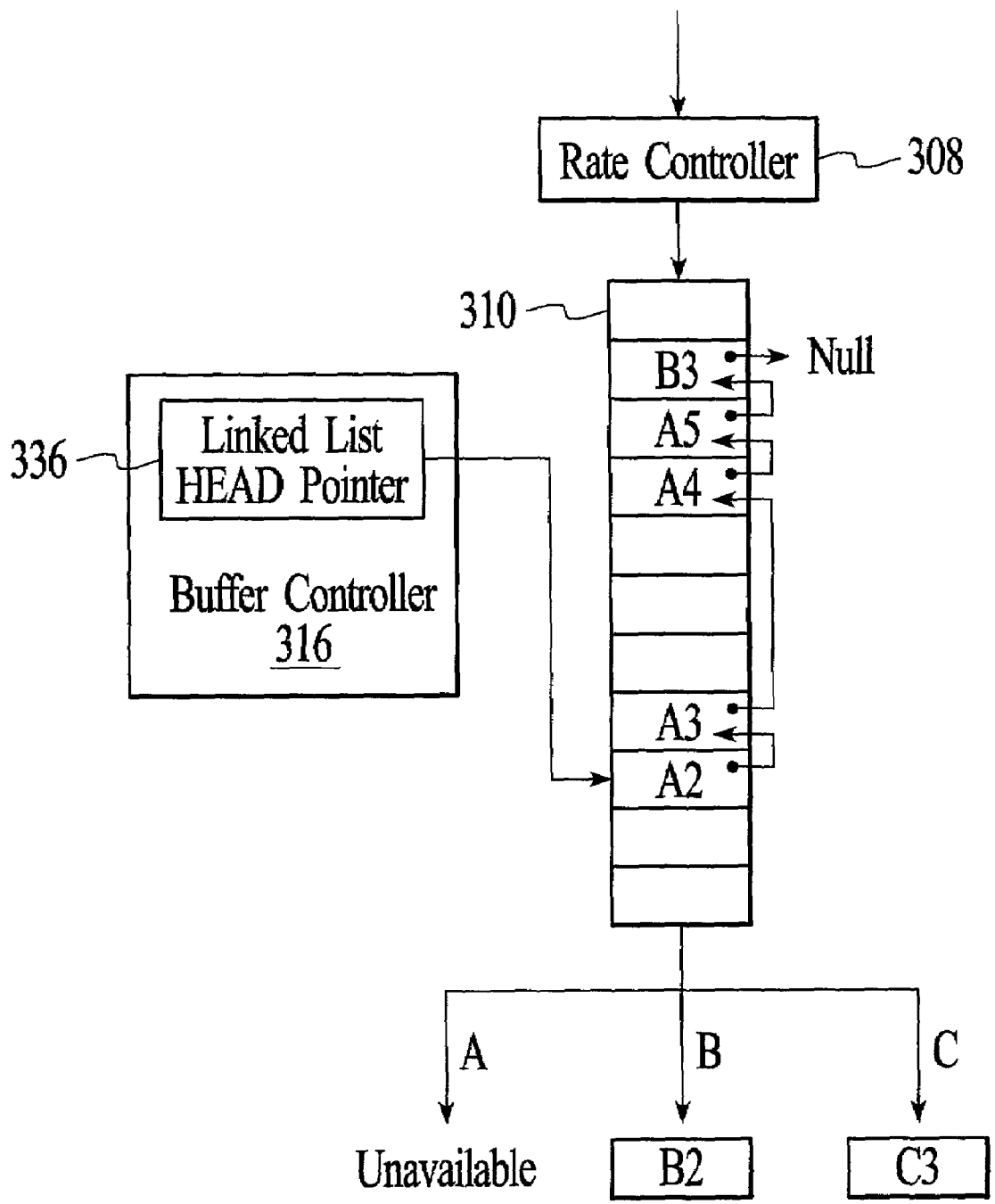
FIG. 10 is a logical depiction of dispatch cycle 3 after packets have been dispatched to available output links in accordance with an embodiment of the invention.

FIG. 10 logically depicts the status of the linked list and the linked list HEAD pointer 336 after packets B2 and C3 have been dispatched to their respective output links. As shown in FIG. 10, packet B2 is removed from the linked list by adjusting the NEXT pointer of packet A3 and packet C3 is removed from the linked list by adjusting the NEXT pointer of packet B3 to a null value. Because the packet at the head of the linked list, packet A2, is not dispatched, the linked list HEAD pointer continues to identify packet A2. The process of dispatching packets continues as long as there are buffered packets.

Figure 11:
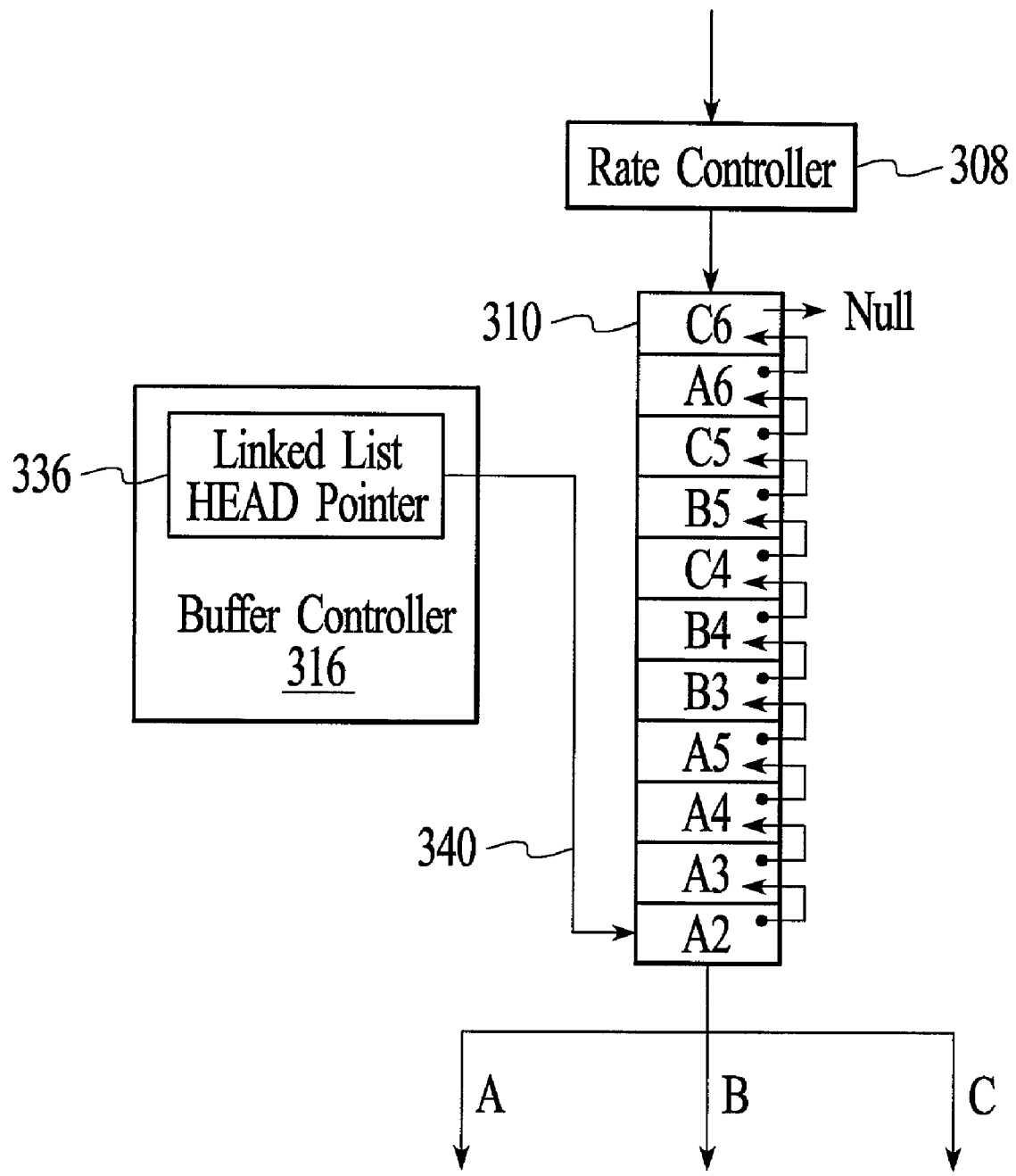
FIG. 11 is a logical depiction of the shared memory buffer of FIG. 10 after new packets have been written into the shared memory buffer.

New packets continue to be written into the shared memory buffer even as packets are dispatched to their intended output links. Each new packet that is written into the shared memory buffer is attached to the end of the linked list. A new packet is attached to the end of the linked list by adjusting the NEXT pointer of the last packet on the linked list to identify the newly stored packet. FIG. 11 is a logical depiction of the shared memory buffer shown in FIG. 10 after six new packets have been written into the shared memory buffer. As depicted in FIG. 11, the five packets remaining from FIG. 10 (packets A2, A3, A4, A5, and B3) maintain their same order on the linked list and the newly stored packets are linked to the list in the order that they are written into the shared memory buffer. Packets can be written into the shared memory buffer while dispatch cycles are in progress.

Although FIGS. 4–11 depict packets that are linked together, the packets may be represented by packet-specific queue elements that include pointers which identify an actual memory location of the packet. The packets can be linked and dispatched by the buffer controller via the packet-specific queue elements that represent the packets.

The packets described herein can be variable-length packets such as Ethernet packets or fixed-length packets such as asynchronous transfer mode (ATM) packets.

Figure 12:
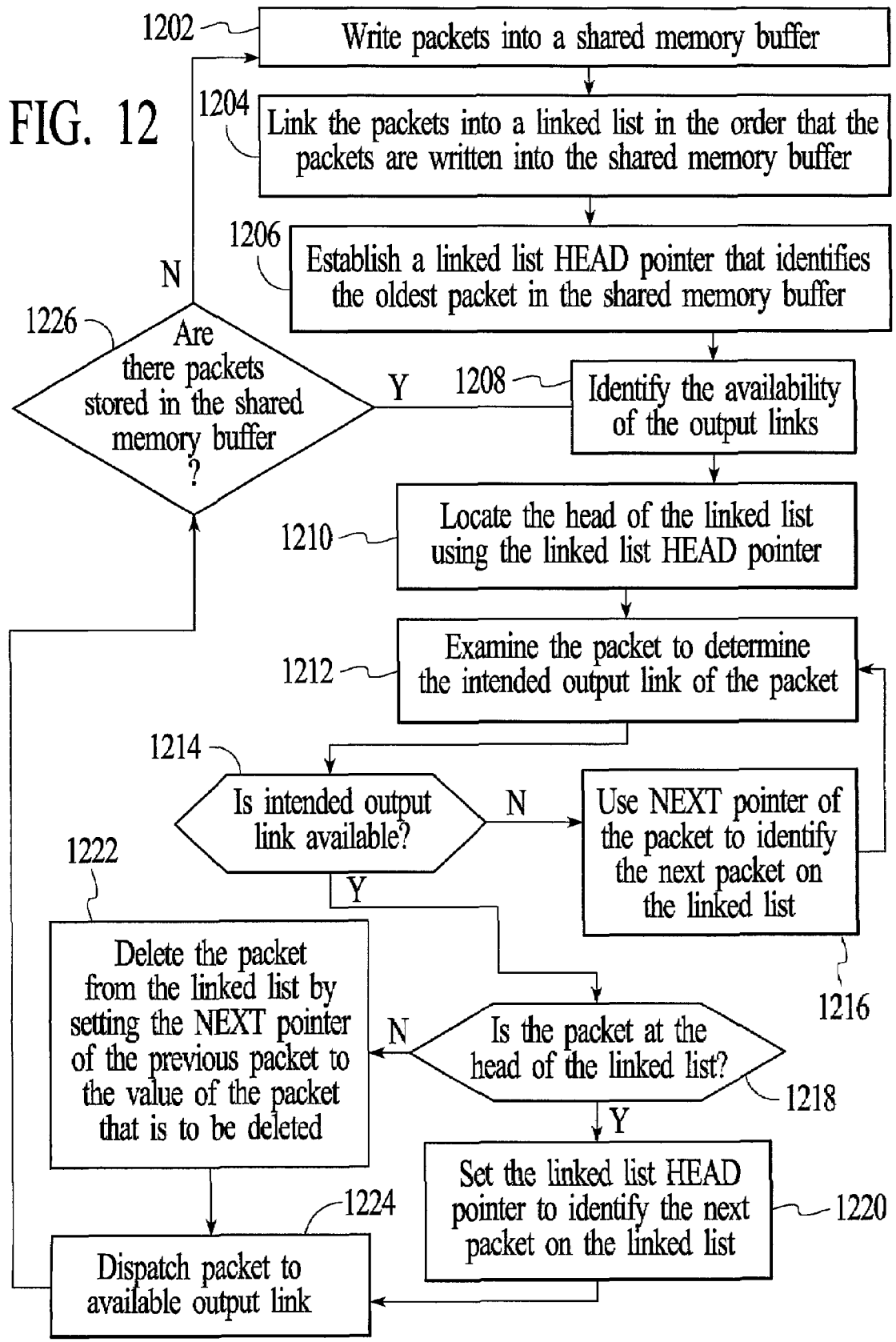
FIG. 12 depicts a flow diagram of a process for managing packets in a shared memory buffer in accordance with an embodiment of the invention.

FIG. 12 depicts a flow diagram of a process for managing packets in a shared memory buffer that serves multiple outputs. At step 1202, packets are written into a shared memory buffer that serves multiple outputs. At step 1204, the packets are linked into a linked list in the order that the packets are written into the shared memory buffer. At step 1206, a linked list HEAD pointer that identifies the oldest packet in the shared memory buffer is established. At step 1208, the availability of the output links is established. At step 1210, the head of the linked list is located using the linked list HEAD pointer. At step 1212, the packet is examined to determine the intended output link of the packet. At decision point 1214, it is determined if the intended output link is available. If the intended output link is not available, then at step 1216, the NEXT pointer of the packet is used to identify the next packet on the linked list and at step 1212, the next packet is examined. If the intended output link is available, then at decision point 1218, it is determined if the packet is at the head of the linked list. If the packet is at the head of the linked list, then at step 1220, the linked list HEAD pointer is set to identify the next packet on the linked list. If the packet is not at the head of the linked list, then at step 1222, the packet is deleted from the linked list by setting the NEXT pointer of the previous packet to the value of the packet that is to be deleted. Whether the identified packet is at the head or in the middle of the linked list, at step 1224, the packet is dispatched to the available output link. At decision point 1226, if there are more packets stored in the shared memory buffer, then the process is repeated. If there are no more packets stored in the shared memory buffer, then the process is repeated when a new packet, or packets, is written into the shared memory buffer.

Note that new packets can be written into the shared memory buffer while a dispatch cycle is in progress.

Although specific embodiments of the invention have been described and illustrated, the invention is not to be limited to the specific forms or arrangements of parts as described and illustrated herein. The invention is limited only by the claims.

What is claimed is:

1. A method for managing packets in a shared memory buffer that serves a plurality of output links comprising:
    writing packets into said shared memory buffer;
    linking said packets into a linked list in the order that said packets are written into said shared memory buffer;
    using said linked list to identify the oldest packet that is intended for an output link that is available for packet transmission;
    dispatching, to the respective available output link, said identified oldest packet that is intended for an available output link even if said identified oldest packet is preceded by an older packet that is intended for an unavailable output link; and
    establishing an output link identifier (ID) for each packet that identifies the intended output link of the respective packet.

2. The method of claim 1 wherein linking said packets into a linked list includes establishing a NEXT pointer for each packet that identifies the next packet on the linked list.

3. The method of claim 1 further including using said output link ID of a packet to determine whether the respective packet is intended for an available output link.

4. The method of claim 1 further including establishing a linked list HEAD pointer that identifies the oldest packet that is written into said shared memory buffer.

5. The method of claim 4 wherein identifying the oldest packet that is intended for an available output link is repeated in dispatch cycles, wherein each dispatch cycle begins at the packet that is identified by the linked list HEAD pointer.

6. The method of claim 4 wherein dispatching said identified oldest packet includes:
    if said dispatched packet is at the head of said linked list, then setting said linked list HEAD pointer to identify the next packet on said linked list; and
    if said dispatched packet is not at the head of said linked list, then deleting said dispatched packet from said linked list by setting a NEXT pointer for the previous packet on said linked list to the same value as the dispatched packet's NEXT pointer.

7. The method of claim 1 further including identifying the availability of each of said output links.

8. The method of claim 7 wherein packets are dispatched in dispatch cycles and further including assessing the availability of each of said output links at the beginning of each dispatch cycle.

9. The method of claim 8 further including dispatching multiple packets in the same dispatch cycle if there are multiple packets that are intended for available output links.

10. The method of claim 1 wherein said packets are variable-length packets.

11. A system for managing packets in a shared memory buffer that serves a plurality of output links comprising:
    a shared memory buffer, that serves a plurality of output links, for storing packets that are intended for said output links;
    a buffer controller connected to manage packets stored within said shared memory buffer, said buffer controller including means for:
        linking said packets into a linked list in the order that said packets are written into said shared memory buffer;
        using said linked list to identify the oldest packet that is intended for an output link that is available for packet transmission; and
        dispatching, to the respective available output link, said identified oldest packet that is intended for an available output link even if said identified oldest packet is preceded by an older packet that is intended for an unavailable output link;
    wherein said buffer controller further includes means for establishing an output link identifier (ID) for each stored packet that identifies the intended output link of the respective packet.

12. The system of claim 11 wherein linking said packets into a linked list includes establishing a NEXT pointer for each stored packet that identifies the next packet on the linked list.

13. The system of claim 11 wherein said buffer controller further includes means for using said output link ID of a packet to determine whether the respective packet is intended for an available output link.

14. The system of claim 11 wherein said buffer controller further includes a linked list HEAD pointer that identifies the oldest packet that is written into said shared memory buffer.

15. The system of claim 14 wherein identifying the oldest packet that is intended for an available output link is repeated in cycles, wherein each cycle begins at the packet that is identified by the linked list HEAD pointer.

16. The system of claim 14 wherein said buffer controller includes means for:
    if a dispatched packet is at the head of said linked list, then setting said linked list HEAD pointer to identify the next packet on said linked list; and
    if a dispatched packet is not at the head of said linked list, then deleting said dispatched packet from said linked list by setting a NEXT pointer for the previous packet on the list to the same value as the dispatched packet's NEXT pointer.

17. The system of claim 11 further including connections between said buffer controller and said output links for identifying the availability of each of said output links.

18. The system of claim 17 wherein packets are dispatched in dispatch cycles and wherein the availability of each of said output links is assessed in each dispatch cycle.

19. The system of claim 18 wherein said buffer controller includes means for dispatching multiple packets in the same dispatch cycle if there are multiple packets that are intended for available output links.

20. The system of claim 11 wherein said packets are variable-length packets.

21. A method for managing packets in a shared memory buffer that serves a plurality of output links comprising:
    writing packets into said shared memory buffer;
    linking said packets into a linked list in the order that said packets are written into said shared memory buffer;
    identifying the oldest packet that is written into said shared memory buffer;
    identifying the availability of each of said plurality of output links;
    starting at the identified oldest packet that is written into said shared memory buffer, examining said packets in said output buffer in the order that is dictated by said linked list to identify the oldest packet that is intended for an available output link;

dispatching, to the respective available output link, the packet that is identified as the oldest packet that is intended for an available output link; and setting an output link identifier (ID) for each packet that identifies the intended output link of the respective packet.

22. The method of claim 21 wherein said oldest packet that is intended for an available output link is dispatched even if said dispatched oldest packet is not identified as the oldest packet on said linked list.

23. The method of claim 21 wherein linking said packets includes setting a NEXT pointer for each packet that identifies the next packet on said linked list.

24. The method of claim 23 further including establishing a linked list HEAD pointer that identifies the oldest packet that is written into said shared memory buffer.

25. The method of claim 24 wherein dispatching said oldest packet includes:
   if said dispatched oldest packet is at the head of said linked list, then setting said linked list HEAD pointer to identify the next packet on said linked list; and
   if said dispatched oldest packet is not at the head of said linked list, then deleting said oldest packet from said linked list by setting the NEXT pointer for the previous packet on said linked list to the value of the dispatched packet's NEXT pointer.

26. The method of claim 21 wherein examining said packets to identify the oldest packet that is intended for an available output link includes accessing said output link ID of a packet to determine the intended output link of the respective packet.

27. The method of claim 21 wherein packets are dispatched in dispatch cycles, said method further including assessing the availability of said output links at the beginning of each dispatch cycle.

28. The method of claim 27 further including dispatching multiple packets in a single dispatch cycle.

29. A system for managing packets in a shared memory buffer that serves a plurality of output links comprising:
   a shared memory buffer, that serves a plurality of output links, for storing packets intended for said output links:
   a buffer controller connected to manage packets stored within said shared memory buffer, said buffer controller including means for:
      linking said packets into a linked list in the order that said packets are written into said shared memory buffer;
      identifying the oldest packet that is written into said shared memory buffer;
      identifying the availability of each of said plurality of output links;
      starting at the identified oldest packet that is written into said shared memory buffer, examining said packets in said output buffer in the order that is dictated by said linked list to identify the oldest packet that is intended for an available output link; and
      dispatching, to the respective available output link, the packet that is identified as the oldest packet that is intended for an available output link;
   wherein said buffer controller further includes means for setting an output link identifier (ID) for each packet that identifies the intended output link of the respective packet.

30. The system of claim 29 wherein said oldest packet that is intended for an available output link is dispatched even if said dispatched oldest packet is not identified as the oldest packet on said linked list.

31. The system of claim 29 wherein linking said packets includes setting a NEXT pointer for each packet that identifies the next packet on said linked list.

32. The system of claim 31 wherein said buffer controller further includes means for establishing a linked list HEAD pointer that identifies the oldest packet that is written into said shared memory buffer.

33. The system of claim 32 wherein said buffer controller includes means for:
   if said dispatched oldest packet is at the head of said linked list, then setting said linked list HEAD pointer to identify the next packet on said linked list; and
   if said dispatched oldest packet is not at the head of said linked list, then deleting said oldest packet from said linked list by setting the NEXT pointer for the previous packet on said linked list to the value of the dispatched packet's NEXT pointer.

34. The system of claim 29 wherein examining said packets to identify the oldest packet that is intended for an available output link includes accessing said output link ID of a packet to determine the intended output link of the respective packet.

35. The system of claim 29 further including connections between said buffer controller and said output links for identifying the availability of each of said output links.

36. The system of claim 29 wherein said buffer controller includes means for dispatching packets in cycles and for assessing the availability of said output links at the beginning of each dispatch cycle.

37. The system of claim 36 wherein said buffer controller further includes dispatching multiple packets in a single dispatch cycle.

38. A method for managing packets in a shared memory buffer that serves a plurality of output links comprising:
   writing packets into said shared memory buffer;
   linking said packets into a linked list in the order that said packets are written into said shared memory buffer;
   using said linked list to identify the oldest packet that is intended for an output link that is available for packet transmission; and
   dispatching, to the respective available output link, said identified oldest packet that is intended for an available output link even if said identified oldest packet is preceded by an older packet that is intended for an unavailable output link;
   wherein linking said packets into a linked list includes establishing a NEXT pointer for each packet that identifies the next packet on the linked list.

39. A system for managing packets in a shared memory buffer that serves a plurality of output links comprising:
   a shared memory buffer, that serves a plurality of output links, for storing packets that are intended for said output links;
   a buffer controller connected to manage packets stored within said shared memory buffer, said buffer controller including means for:
      linking said packets into a linked list in the order that said packets are written into said shared memory buffer;
      using said linked list to identify the oldest packet that is intended for an output link that is available for packet transmission; and dispatching, to the respective available output link, said identified oldest packet that is intended for an available output link even if said identified oldest packet is preceded by an older packet that is intended for an unavailable output link;

wherein linking said packets into a linked list includes establishing a NEXT pointer for each stored packet that identifies the next packet on the linked list.

40. A method for managing packets in a shared memory buffer that serves a plurality of output links comprising:

writing packets into said shared memory buffer;

linking said packets into a linked list in the order that said packets are written into said shared memory buffer;

identifying the oldest packet that is written into said shared memory buffer;

identifying the availability of each of said plurality of output links;

starting at the identified oldest packet that is written into said shared memory buffer, examining said packets in said output buffer in the order that is dictated by said linked list to identify the oldest packet that is intended for an available output link; and dispatching, to the respective available output link, the packet that is identified as the oldest packet that is intended for an available output link;

wherein linking said packets includes setting a NEXT pointer for each packet that identifies the next packet on said linked list.

41. A system for managing packets in a shared memory buffer that serves a plurality of output links comprising:

a shared memory buffer, that serves a plurality of output links, for storing packets intended for said output links:

a buffer controller connected to manage packets stored within said shared memory buffer, said buffer controller including means for:

linking said packets into a linked list in the order that said packets are written into said shared memory buffer;

identifying the oldest packet that is written into said shared memory buffer;

identifying the availability of each of said plurality of output links;

starting at the identified oldest packet that is written into said shared memory buffer, examining said packets in said output buffer in the order that is dictated by said linked list to identify the oldest packet that is intended for an available output link; and dispatching, to the respective available output link, the packet that is identified as the oldest packet that is intended for an available output link;

wherein linking said packets includes setting a NEXT pointer for each packet that identifies the next packet on said linked list.

* * * * *